United States Patent
Bhanage

(10) Patent No.: US 10,136,262 B2
(45) Date of Patent: Nov. 20, 2018

(54) DETECTING MOVEMENT IN A PHYSICAL ENVIRONMENT

(71) Applicant: ARUBA NETWORKS, INC., Sunnyvale, CA (US)

(72) Inventor: Gautam Bhanage, Sunnyvale, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 257 days.

(21) Appl. No.: 14/263,564

(22) Filed: Apr. 28, 2014

(65) Prior Publication Data
US 2015/0312877 A1 Oct. 29, 2015

(51) Int. Cl.
| | | |
|---|---|---|
| *H04W 4/029* | (2018.01) | |
| *H04W 4/04* | (2009.01) | |
| *H04W 16/28* | (2009.01) | |
| *H04W 64/00* | (2009.01) | |
| *H04W 84/12* | (2009.01) | |

(52) U.S. Cl.
CPC .............. *H04W 4/029* (2018.02); *H04W 4/04* (2013.01); *H04W 16/28* (2013.01); *H04W 64/006* (2013.01); *H04W 84/12* (2013.01)

(58) Field of Classification Search
CPC .............. H04W 24/02; H04W 72/0406; H04L 25/0222; H04L 25/0202; H04L 25/0228; H04L 5/006; H04L 5/0085; H04L 25/0224; G01S 13/003; G01S 13/0209; G01S 13/04; G01S 13/42; G01S 13/878; G01S 7/282; G01S 7/285; G01S 7/292
See application file for complete search history.

(56) References Cited

U.S. PATENT DOCUMENTS

| | | | | |
|---|---|---|---|---|
| 2002/0113705 | A1* | 8/2002 | Wallace ................... | G08B 6/00 340/568.7 |
| 2007/0201566 | A1* | 8/2007 | Solomon .............. | H04B 7/0417 375/260 |
| 2008/0111686 | A1* | 5/2008 | Hall ........................ | G01S 7/282 340/552 |
| 2010/0207804 | A1* | 8/2010 | Hayward .............. | G01S 13/003 342/28 |
| 2010/0227561 | A1* | 9/2010 | Chakraborty ......... | H04L 5/0007 455/63.1 |
| 2011/0063110 | A1* | 3/2011 | Habib ................ | G08B 13/2491 340/552 |

(Continued)

*Primary Examiner* — Lester Kincaid
*Assistant Examiner* — Dung Lam
(74) *Attorney, Agent, or Firm* — Hewlett Packard Enterprise Patent Department

(57) ABSTRACT

The present disclosure discloses a method and network device for detecting movement in a physical environment. Specifically, a network device obtains a first feedback information for a first set of wireless signals transmitted by a first device in a physical environment and received by a second device in the physical environment. Moreover, the network device obtains a second feedback information for a second set of wireless signals transmitted by the first device and received by the second device. The network device then compares the first feedback information to the second feedback information to identify a first set of one or more difference values. Based on the first set of one or more difference values, the network device determines that one or more physical entities within the physical environment have moved.

20 Claims, 6 Drawing Sheets

(56) References Cited

U.S. PATENT DOCUMENTS

2011/0269481 A1* 11/2011 Halfmann ............ H04W 64/00
455/456.1
2015/0237513 A1* 8/2015 Garrett ................ H04L 25/0224
370/252

* cited by examiner

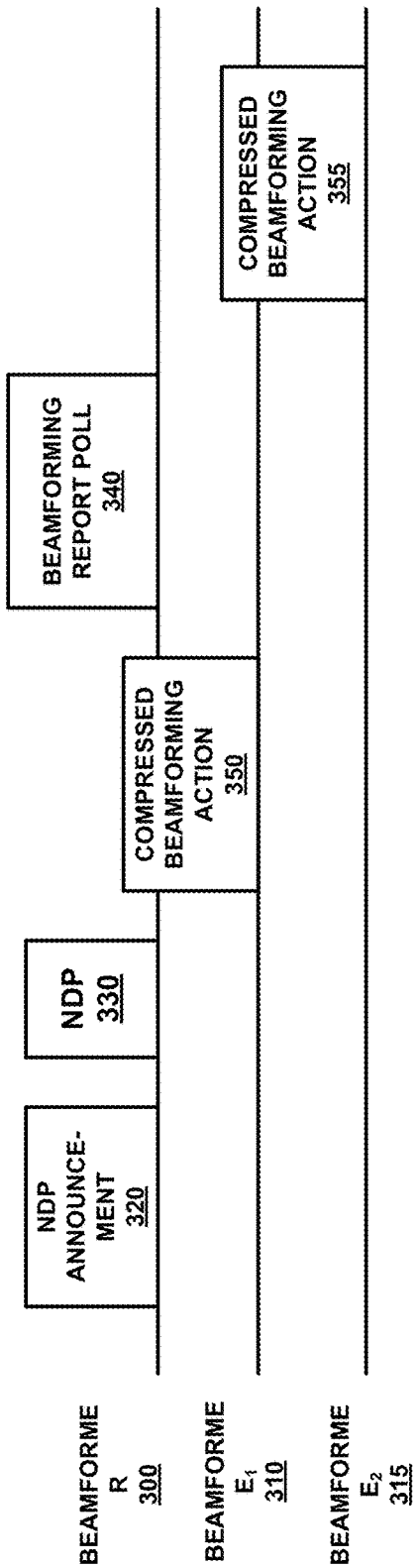

DETECTING MOVEMENT IN A PHYSICAL ENVIRONMENT

FIELD

The present disclosure relates to network management in a wireless local area network (WLAN). In particular, the present disclosure relates to a mechanism for detecting movement in a physical environment. Further, the physical environment is deployed with a WLAN.

BACKGROUND

Wireless digital networks, such as networks operating under the current Electrical and Electronics Engineers (IEEE) 802.11 standards, are spreading in their popularity and availability. Currently, in a wireless local area network (WLAN), specialized hardware sensory devices are deployed at different physical locations for various purposes, for example, power optimization, security surveillance, emergency service, etc. These sensory devices usually are battery-powered or have their own power supply cables rather than Power over Ethernet (PoE) ports for receiving power.

Conventionally, detecting physical activity in an environment for security surveillance is achieved by detecting a Doppler shift in the carrier frequency by specialized hardware devices. A Doppler shift generally refers to a change in the carrier frequency because one or more objects have moved in the environment. Adding functionality of detecting Doppler shifts to access points would require adding specialized hardware components to a WLAN chipset, which would incur an additional cost. Moreover, additional hardware component on the WLAN chipset would also result in more power consumptions. With PoE enabled, it is important for an access point to conserve power consumptions. Thus, given the cost and power limits mentioned above, a typical WLAN chipset has no functionality of detecting Doppler shifts to avoid sacrificing basic functionalities.

BRIEF DESCRIPTION OF THE DRAWINGS

The present disclosure may be best understood by referring to the following description and accompanying drawings that are used to illustrate embodiments of the present disclosure.

FIG. 3 illustrates exemplary channel calibration process for beamforming with Multi-user, Multi-Input, Multi-Output (MU-MIMO) according to embodiments of the present disclosure.

DETAILED DESCRIPTION

In the following description, several specific details are presented to provide a thorough understanding. While the context of the disclosure is directed to network management in wireless networks, one skilled in the relevant art will recognize, however, that the concepts and techniques disclosed herein can be practiced without one or more of the specific details, or in combination with other components, etc. In other instances, well-known implementations or operations are not shown or described in details to avoid obscuring aspects of various examples disclosed herein. It should be understood that this disclosure covers all modifications, equivalents, and alternatives falling within the spirit and scope of the present disclosure.

Overview

Embodiments of the present disclosure relate to network management in a wireless local area network (WLAN). In particular, the present disclosure relates to a mechanism for detecting physical activities in a physical environment.

According to embodiments of the present disclosure, access points (APs) in WLANs have radio frequency capabilities that can be leveraged to serve such purposes independently or in addition to existing infrastructure. For example, APs may detect physical activities by detecting radio frequency changes in a multipath environment. For client devices that are associated with APs in the WLAN, the disclosed system can save feedback information received from those clients to the APs, and measure the multipath environment parameters from time to time. If a change in the multipath environment is detected, then the disclosed system can determine that there has been a change in the physical environment caused by physical activities. Moreover, by determining the degree of change in the multipath environment, the disclosed system can determine what type of physical activities and how much physical activities have occurred in the physical environment within the WLAN coverage area.

With the solution provided herein, the disclosed network device obtains a first feedback information for a first set of wireless signals transmitted by a first device in a physical environment and received by a second device in the physical environment. The disclosed network device also obtains a second feedback information for a second set of wireless signals transmitted by the first device and received by the second device. The disclosed network device then compares the first feedback information to the second feedback information to identify a first set of one or more difference values. Based on the first set of one or more difference values, the disclosed network device determines that one or more physical entities within the physical environment have moved.

Computing Environment

Figure 1:
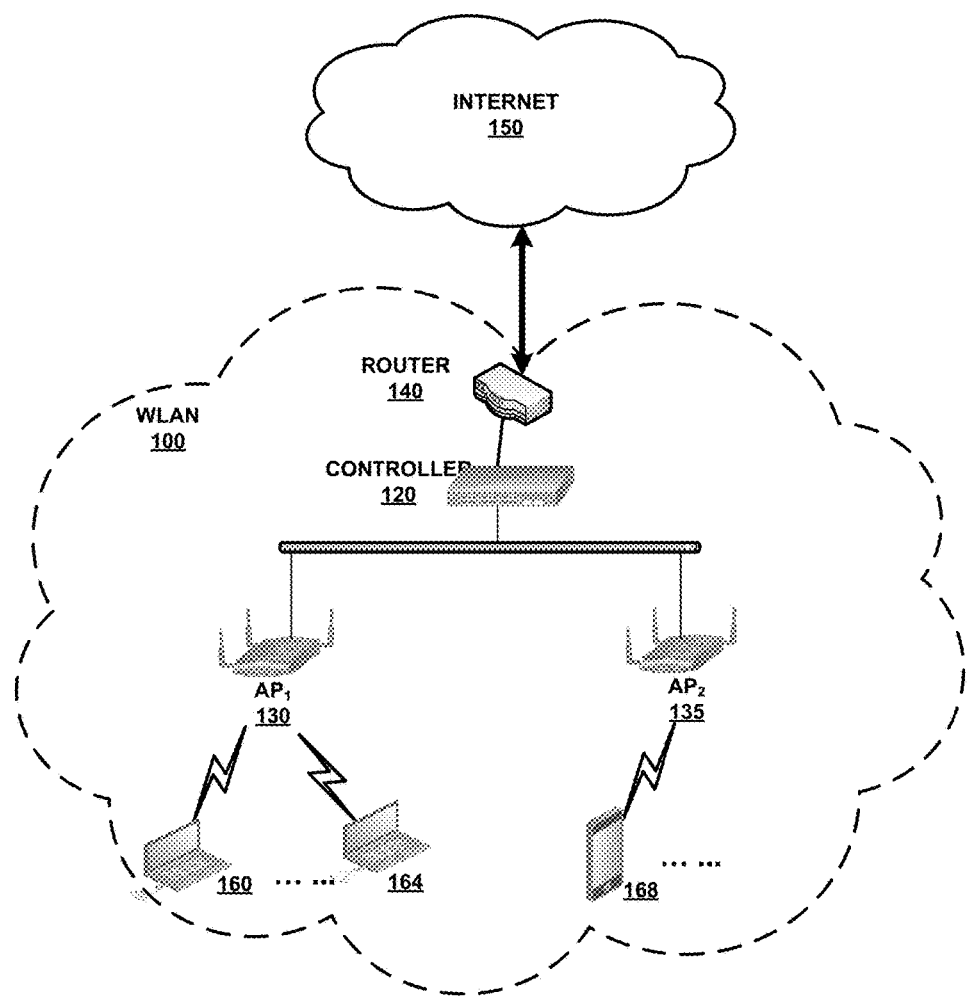
FIG. 1 shows exemplary computing environment according to embodiments of the present disclosure.

FIG. 1 shows exemplary computing environment according to embodiments of the present disclosure. Specifically, FIG. 1 includes a controller 120 and a plurality of access points, e.g., AP₁ 130 and AP₂ 135, in a wireless local area network (WLAN) 100. WLAN 100 may be also connected to Internet 150 or another external network via a router 140. Moreover, controller 120 is communicatively coupled with one or more access points (APs), such as AP₁ 130 and AP₂ 135, to provide wireless network services by transmitting network packets.

Network according to embodiments of the present disclosure may operate on a private network including one or more local area networks. The local area networks may be adapted to allow wireless access, thereby operating as a wireless local area network (WLAN). In some embodiments, one or more networks may share the same extended service set (ESS) although each network corresponds to a unique basic service set (BSS) identifier.

In addition, network depicted in FIG. 1 may include multiple network control plane devices, such as network controllers, access points or routers capable of controlling functions, etc. Each network control plane device may be located in a separate sub-network. The network control plane device may manage one or more network management devices, such as access points or network servers, within the sub-network.

Moreover, in the exemplary network depicted in FIG. 1, a number of client devices are connected to the access points in the WLAN. For example, client devices 160-164 are associated with $AP_1$ 130, and client devices, such as client device 168, are associated with $AP_2$ 135. Note that, client devices may be connected to the access points via wired or wireless connections. Frames transmitted between the clients and the APs include, but are not limited to, feedback frames containing beamforming data related to a number of wireless client devices.

During operations, a wireless station, such as client device 160, client device 164, or client device 168, is associated with a respective access point, e.g., access point $AP_1$ 130, access point $AP_2$ 135, etc. Each AP has the capability of beamforming. Beamforming generally refers to a signal processing technique used in sensor arrays for directional signal transmission or reception that focuses energy toward a receiver. Beamforming typically is achieved by combining elements in a phased array in such a way that signals at particular angles experience constructive interference while others experience destructive interference. Beamforming can be used at both the transmitting and receiving ends in order to achieve spatial selectivity.

An AP can initiate a frame exchange to a client device by exchanging frames to measure the channel. The result of the channel measurement is a derivation of the steering matrix, which is a mathematical description of how to direct transmitted energy toward the receiver. The steering matrix describes how to set up each element of the transmitter's antenna system to precisely overlap transmissions to reach farther.

After completing the channel measurement, the AP acts as a beamformer and sends spatially focused frames to the client device. At the conclusion of the data transmission, the client device will acknowledge receipt of the data. This acknowledgement may be beamformed as well. In a frame exchange between two devices, either side may choose to calibrate the channel for beamforming purposes.

Multipath Environment

Figure 2A:
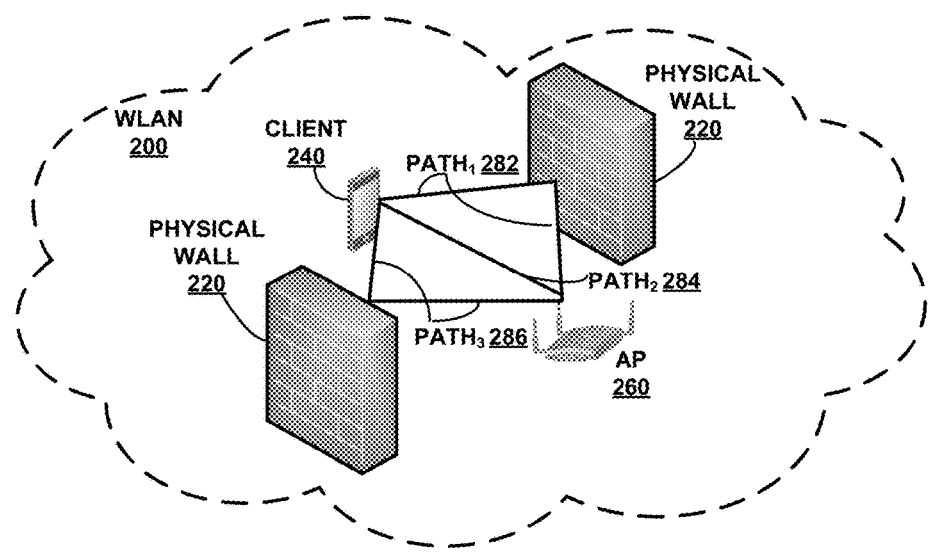
FIGS. 2A-2B illustrate exemplary changes in multipath according to embodiments of the present disclosure.
Figure 2B:
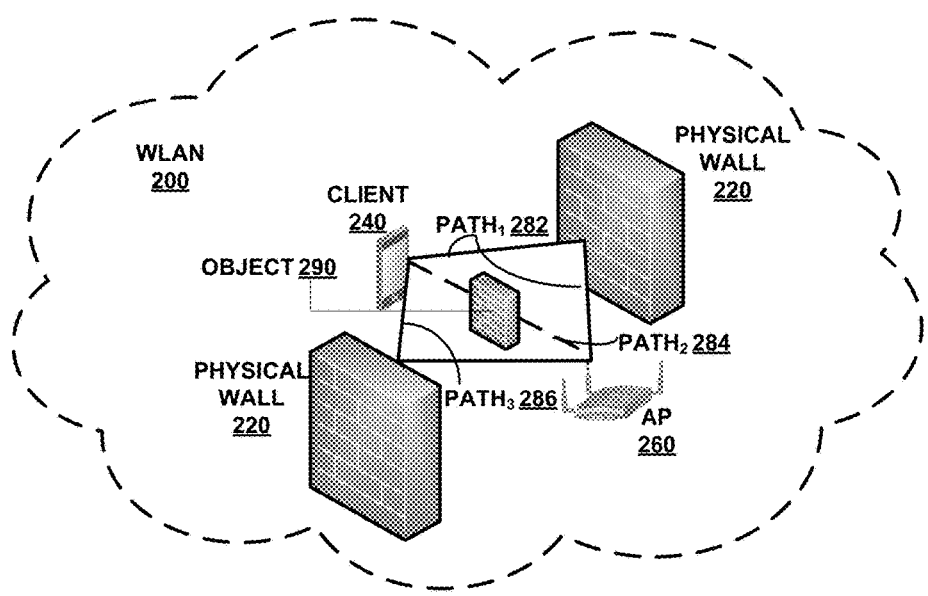

FIGS. 2A-2B illustrate exemplary changes in multipath according to embodiments of the present disclosure. Specifically, FIG. 2A illustrates an initial multipath state between a client and an AP in a WLAN. FIG. 2A includes a WLAN 200 deployed in a physical environment that has two physical walls 220 opposing each other with no other physical barriers in between. WLAN 200 includes an access point 260 and a client device 240 communicatively coupled with each other. In this example, a wireless signal transmitted from client 240 to AP 260 travels through three dominant paths, including one direct path $path_2$ 284 from client 240 to AP 260 and two indirect paths, namely $path_1$ 282 and $path_3$ 286 where the signals received by AP 260 is reflected by walls 220.

FIG. 2B illustrates a change in the multipath state between the client and the AP in the WLAN. FIG. 2B includes a WLAN 200 deployed in a physical environment that has two physical walls 220 opposing each other with object 290 in between. WLAN 200 includes an access point 260 and a client device 240 communicatively coupled with each other.

Here, due to the blockage from object 290, a wireless signal transmitted from client 240 to AP 260 travels through only two dominant paths, including no direct path but two indirect paths, namely $path_1$ 282 and $path_3$ 286 where the signals received by AP 260 is reflected by walls 220.

MU-MIMO Channel Calibration

FIG. 3 illustrates exemplary channel calibration process for beamforming with Multi-user, Multi-Input, Multi-Output (MU-MIMO) according to embodiments of the present disclosure. FIG. 3 includes at least a beamformer 300 and two beamformees, namely $beamformee_1$ 310 and $beamformee_2$ 315. A device that shapes its transmitted frames is called a beamformer, and a receiver of such frames is called a beamformee. As a part of beamforming process, a beamformer needs to transmit sounding frames.

According to IEEE 802.11 ac standard, the multi-user channel sounding procedure requires a response from all beamformees, such as $beamformee_1$ 310 and $beamformee_2$ 315. Each beamformee contributes information in a feedback matrix. Then, beamformer 300 uses multiple feedback matrices to produce one steering matrix.

Specifically, in the example illustrated in FIG. 3, beamformer 300 will first transmit a Null Data Packet (NDP) Announcement frame 320 to announce for the data packets to be transmitted. NDP Announcement frame 320 includes information indicating the channel matrix. NDP Announcement frame 320 is followed by a NDP frame 330 that puts the transmission out to begin the calibration. However, to retrieve the feedback matrix from each beamformee, the MU-MIMO sounding procedure needs a new frame, namely the Beamforming Report Poll frame 340, to ensure that responses from all beamformees are collected. Since there are two beamformees illustrated in FIG. 3, the beamformer must use one beamforming report poll frame 340 to obtain the feedback matrices from $beamformee_2$ 315. Note that, no poll frame is required for the first station named in the VHT NDP Announcement frame 320, but the second and subsequent beamformees must be polled. After receiving multiple responses, the beamformer 300 will integrate all the responses together into a master steering matrix.

A. NDP Announcement Frame

The channel sounding procedure is started by transmission of an NDP Announcement frame. A multi-user NDP Announcement frame includes, but is not limited to, multiple Station Information records (one for each beamformee). In the Station Information fields, NDP Announcement frame 320 is used to request multi-user feedback. When NDP Announcement frame 320 is sent to multiple receivers, the receiver address is the broadcast address. Also, NDP Announcement frame 320 indicates which clients should respond to the frame.

B. NDP Frame

Upon transmission of NDP Announcement frame 320, beamformer 300 next transmits a Null Data Packet frame 330. A single null data packet has no Media Access Control (MAC) header information and will be received by all devices. Each device can use the received training frames in the null data packet to calculate its own feedback matrix.

C. Compressed Beamforming Action Frame

Following receipt of the NDP, beamformee 310 responds with a feedback matrix. The feedback matrix tells beamformer 300 how the training symbols in the NDP were received, and therefore how beamformer 300 should steer the frame to beamformee 310. Compressed Beamforming Action frame 350/355 includes, among others, a header indicating that the frame contains a feedback matrix, and a Multi-User Exclusive Beamforming Report field, which carries signal-to-noise (SNR) ratio differences between subcarriers and is needed to update the steering matrix when there are multiple recipients. The size of MU Exclusive Beamforming Report field varies based on the number of spatial streams as well as the channel bandwidth.

D. Beamforming Report Poll Frame

To retrieve additional feedback from the second and subsequent beamformees, beamformer 300 will use Beamforming Report Poll frame 340, which is a control frame. Beamforming Report Poll frame 340 is essentially a one-byte field of retransmission requests. Each bit in the Feedback Bitmap field requests one feedback segment to be retransmitted.

Once the multi-user channel sounding is complete, an AP can proceed to send a multi-user transmission. Each beamformee in a multi-user transmission is a user. IEEE 802.11 ac standard supports sending up to four multi-user MIMO transmissions at once, includes a MAC protocol for negotiating the capabilities of each of the simultaneous transmissions. Each multi-user MIMO transmission may have a different number of spatial streams and may have its own modulation speed and coding.

Detection of Physical Movement

Figure 4A:
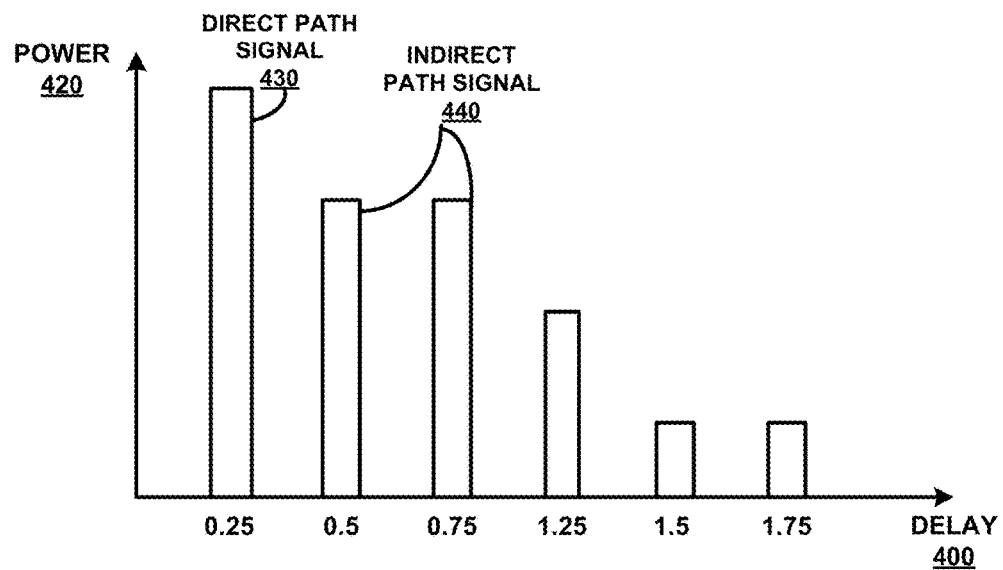
FIGS. 4A-4B illustrate an exemplary power pattern change detected in multipath according to embodiments of the present disclosure.
Figure 4B:
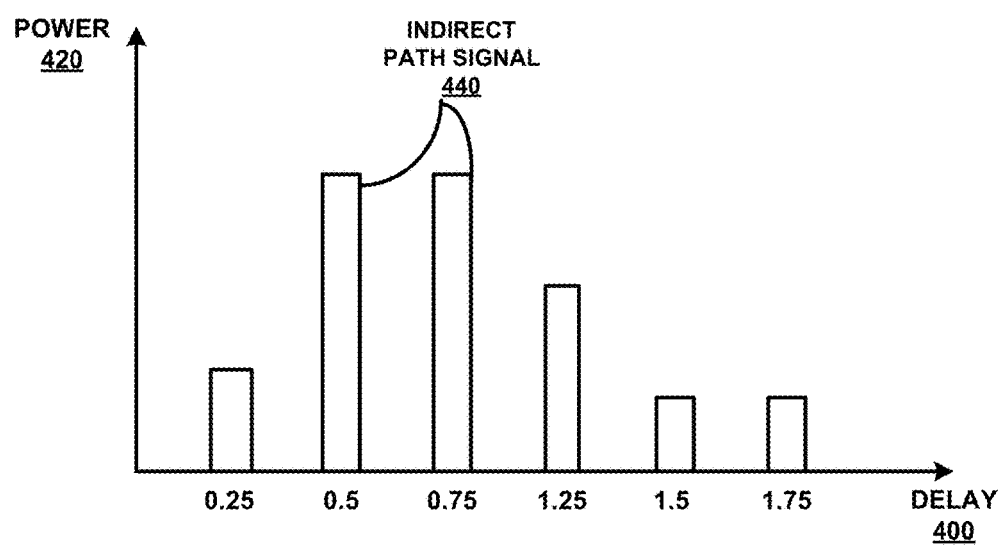

In some embodiments, the disclosed system can determine environment change based on the compressed channel feedback or power delay profile information. FIGS. 4A-4B illustrate exemplary power delay profiles detected in multipath environments according to embodiments of the present disclosure. When performing a sounding procedure for beamforming between a client device (e.g., beamformee) and an AP (e.g., beamformer), the AP can calculate a power delay profile. The power delay profile can be computed using the feedback information received from client device. The feedback information includes information related to every sub-carrier, every antenna, etc. The wider the bandwidth, the more sub-carriers there are; and, the larger the amount of feedback information is. Thus, the feedback information needs to be compressed before sent to the AP (e.g., beamformer) by the client device (e.g., beamformee). FIGS. 4A-4B depicts power energy level for every transmission of a received signal through either a direct or indirect path in a multipath environment.

Specifically, corresponding to the multipath environment illustrated in FIG. 2A, FIG. 4A illustrates a feedback profile received by the AP from different paths. In FIG. 4A, the x-axis, namely delay 400, indicates the amount of time, for example, in microseconds between a starting time point and the time point when a signal from a respective path is received. On the other hand, the y-axis, namely power 420, indicates a power level associated with a received signal from a respective path. For example, at 0.25 microseconds, direct path signal 430 is received with a high power level. At 0.5 and 0.75 microseconds, indirect path signals 440 are received with a medium power level. Subsequently, at 1.25 microseconds, a weaker signal may be received from a fourth path. Moreover, at 1.5 and 1.75 milliseconds, even weaker signals can be received from other indirect paths resulting from other reflections in the multipath environment.

Corresponding to the multipath environment illustrated in FIG. 2B, FIG. 4B illustrates a changed feedback profile received by the AP from different paths. In FIG. 4B, the x-axis, namely delay 400, indicates the amount of time, for example, in microseconds between a starting time point and the time point when a signal from a respective path is received. On the other hand, the y-axis, namely power 420, indicates a power level associated with a received signal from a respective path. Here, at 0.25 microseconds, unlike in FIG. 4A, direct path signal 430 is received with a low power energy level instead of a high power energy level. Similar to FIG. 4A, at 0.5 and 0.75 microseconds, indirect path signals 440 are received with a medium power level. Subsequently, at 1.25 microseconds, a weaker signal may be received from a fourth path. Moreover, at 1.5 and 1.75 microseconds, even weaker signals can be received from other indirect paths resulting from other reflections in the multipath environment.

By comparing the feedback profiles as illustrated in FIG. 4A and FIG. 4B, the system can detect a power change, especially corresponding to a lowered power level for received signal from the path corresponding to the shortest delay, which can be inferred to as the signal from the direct path in the multipath environment. Thus, the system can determine that one or more physical activities have occurred in the physical environment. Note that, in some embodiments, the physical activities can be, for example, a new object between the client device and the AP. In some embodiments, the physical activities can be a movement by the client device itself causing a change in the power delay profile received by the AP. Nevertheless, any type of physical activities in the multipath environment will cause a change in the feedback information and/or the power delay profile that the AP can detect. This is because, in a static radio frequency environment, no change shall be detected by the AP.

It is important to note that, radio frequency (RF) interferences will not affect the sounding process. In the NDP Announcement frame, the AP will also include a time period during which the medium will be busy. Thus, the AP will either receive the feedback information in its entirety or not receiving any feedback information. If an interference signal exists in the RF environment, a collision would occur with a compressed beamforming packet. In such a case, no feedback information will be received by the AP. Thus, once the feedback information is received, the content of the received feedback information will not be affected by network RF interferences. In other words, because the sounding process completely occupies the channel during the particular period of time, the feedback information that indicate signal characteristics of the signals received by the client devices obtained by the AP will not be affected by any external factors, such as network RF interferences. Also, because the sounding process only involves a small numbers of frames, the exclusive occupation of the channel will not significantly affect data transmissions on the channel.

Depending on how frequently the environment changes, the disclosed system may infer the number of objects that move in the environment. Specifically, the disclosed system determines whether the steering matrix has changed and if so, how much has been changed. The steering matrix is matrix generated by an AP upon receiving feedback information from the client device, whereas the feedback information indicates properties of the channel associated with received signal from the AP by the client device. Note that, the channel here refers to multipath rather than frequencies associated with wireless communication channels. The AP then aggregates channel state information (CSI) that is received in a compressed channel feedback frame from each client device. The steering matrix includes a mathematical description of how to direct transmitted energy toward the receiver. In other words, steering matrix describes how to set up each element of the transmitter's antenna system to precisely overlap transmissions to reach farther. Moreover, depending on how frequently the steering matrix changes, the disclosed system may determine the type of object in the physical environment causing the change, e.g., a human object, etc.

Moreover, the interval of delay depicted in FIGS. 4A-4B depends on the RF distance. Different pairs of beamformer and beamformee will correspond to different intervals of delay. However, for the same client and the same AP, the interval will remain the same. The power delay profile as illustrated in FIGS. 4A-4B is to be compared only with the profile corresponding to the same client device (beamformee) and AP (beamformer) at different points of time. Also, once a change has been detected in a power delay profile, the changed profile will be used as the basis for comparison with other power delay profiles received in the future.

In some embodiments, multiple power delay profiles corresponding to the same beamformer and beamforee can be cached by the system. The system may determine that physical activities have occurred in the environment based on a change in each of a threshold number of cached power delay profiles that are subsequently received. Note that, the caching and comparing operations can be performed at an AP, a centralized network control device, a distributed computing device, a server, etc. In some embodiments, the system may determine that physical activities have occurred in the environment based on a changed detected by a threshold number of APs (beamformers) deployed within a particular physical WLAN coverage area. In some embodiments, the system determines that physical activities have occurred within a particular physical WLAN coverage area if a majority number of APs deployed within the same physical WLAN coverage area have detected a change in the environment.

In some embodiments, the system can select a subset of APs in the WLAN to initiate the sounding process based on their respective coverage areas, rather than having all APs in the WLAN perform the sounding process. The system can statically program to select a subset of clients as beamformees in the sounding process, or select all stations with beamforming capabilities to participate in the sounding process.

In some embodiments, the system identifies all client devices which have beamforming capabilities and are currently associated with the WLAN. The system then determines which APs each of such client devices is associated with, and instruct each AP to initiate the sounding process with the respective beamforming-capable client device that are associated with the AP.

In some embodiments, the system identifies a subset of client devices which have beamforming capabilities based on their physical locations. For example, the system can select the client devices that are located relatively far away from each other in the physical environment.

In some embodiments, the system instructs a first AP in a WLAN to initiate a sounding process with a client device, and then cause the client device to disassociate with the first AP. Subsequently, the client device is guided to associate with a second AP in the WLAN. Once the client device is associated with the second AP, the second AP will initiate a sounding process with the same client device. By collecting feedback information from different APs at different locations, the system can better characterize a detected change in the multipath environment.

Process for Detecting Movement in a Physical Environment

Figure 5:
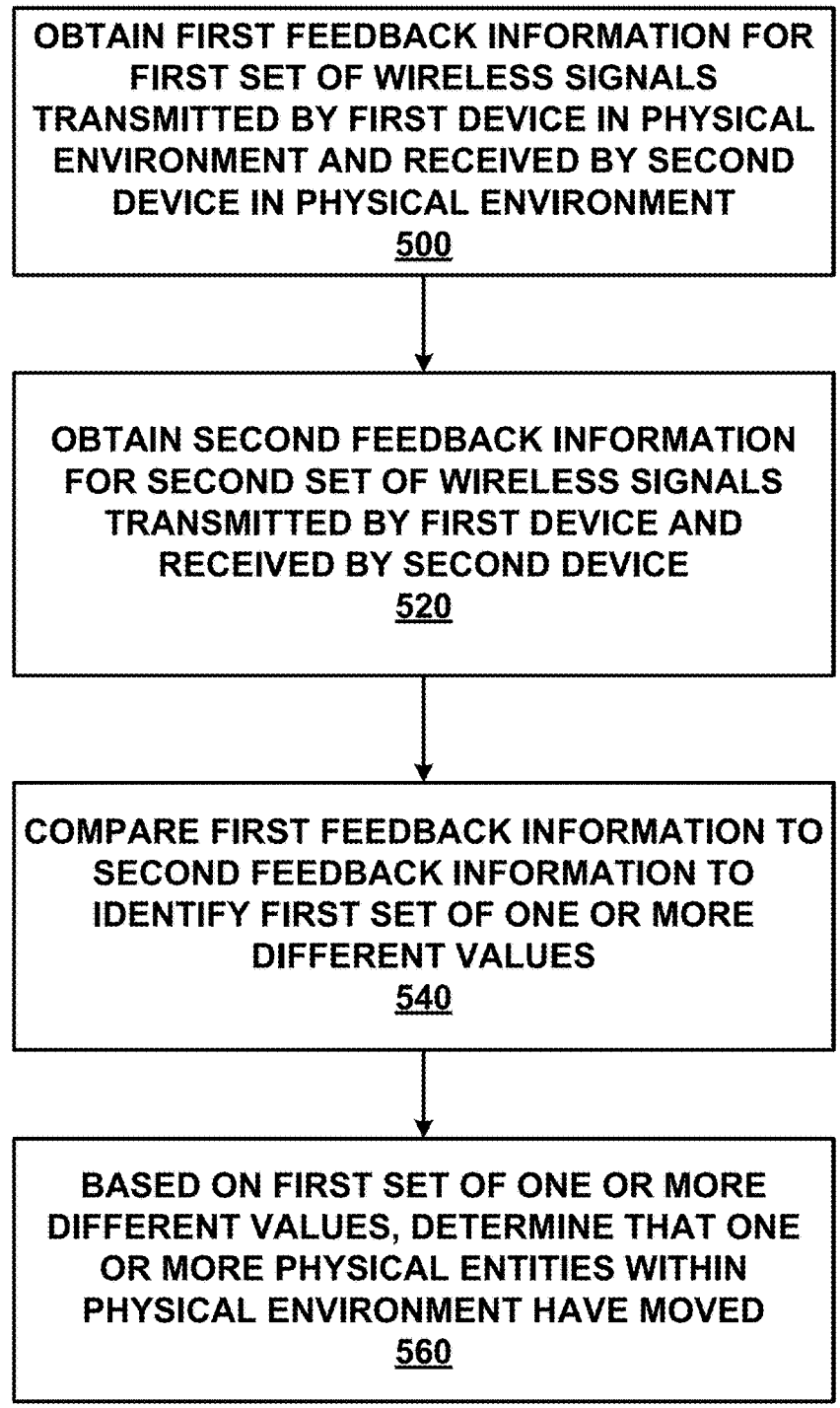
FIG. 5 illustrates an exemplary process for detecting movement in a physical environment according to embodiments of the present disclosure.

FIG. 5 illustrates an exemplary process for detecting movement in a physical environment according to embodiments of the present disclosure. During operations, a network device obtains a first feedback information for a first set of wireless signals transmitted by a first device in a physical environment and received by a second device in the physical environment (operation 500). Moreover, the network device obtains a second feedback information for a second set of wireless signals transmitted by the first device and received by the second device (operation 520). The network device then compares the first feedback information to the second feedback information to identify a first set of one or more difference values (operation 540). Based on the first set of one or more difference values, the network device determines that one or more physical entities within the physical environment have moved (operation 560). Here, the physical entities generally refer to humans, objects, pets, etc. Also, the network device can obtain feedback information by either generating the feedback information, or receiving the feedback information from another device in the WLAN.

Specifically, in some embodiments, the network device can determine that one or more physical entities within the environment have moved based on determining a frequency with which the one or more physical entities have moved within the environment. For example, the network device may determine that a physical entity moves once per minute within the physical environment. In some embodiments, the network device can determine that one or more physical entities within the environment have moved based on determining a number of physical entities that moved within the environment. In some embodiments, the network device can further determine a distance that the one or more physical entities have moved within the physical environment.

Note that, the first feedback information may include a first Power Delay Profile (PDP), whereas the second feedback information may include a second PDP. Furthermore, the first feedback information may include a first Channel State Information (CSI) generated by the second device, whereas the second feedback information may include a second CSI generated by the second device. Moreover, the first and/or the second feedback information are not affected by signal interferences in the WLAN environment.

In some embodiments, determining that the one or more physical entities within the environment has moved is further based on comparing (a) a third feedback information for a third set of wireless signals transmitted by the first device and received by the second device with (b) the first feedback information. Therefore, the physical activities in the environment are confirmed by a consistent detection of changes in the environment. Once the change is confirmed, the changed feedback information (i.e., the third feedback information) is used as basis for further comparisons.

In some embodiments, determining that the one or more physical entities within the physical environment have moved is performed without the use of a location of the first device or the location of the second device.

In some embodiments, the one or more physical entities within the physical environment that are determined to have moved are not either of the first device or the second device. For example, the physical entities can be a physical object (including, e.g., human, pet, and other objects) that is newly introduced in the physical environment and not a part of the WLAN. The one or more physical entities within the physical environment may be one or more of humans or animals, or any other physical objects.

In some embodiments, the first device is a Wireless Access Point (WAP) and the second device is a client device. The first set of wireless signals include a first set of sounding frames, whereas the second set of wireless signals include a second set of sounding frames.

In some embodiments, the network device further obtains a third feedback information for a third set of wireless signals transmitted by a third device and received by a fourth device in an environment. The network device also obtains a fourth feedback information for a fourth set of wireless signals transmitted by the first device and received by the second device. The network device then compares the third feedback information to the fourth feedback information to identify a second set of one or more difference values. The network device further determines that one or more physical entities within the environment have moved is based on both the first set of difference values and the second set of difference values. For example, multiple APs in the WLAN can each independently determine a movement or physical activity occurring in a physical environment. Alternatively, an AP can initiate a sounding process with each of multiple co-located client devices to determine a movement or physical activity occurring in the physical environment. As another example, the system may determine that a movement or physical activity has occurred in the physical environment if a majority of network devices (beamformers) in the WLAN have reported a detected change within a particular WLAN coverage area. In another example, the system may determine that a movement or physical activity has occurred in the physical environment if a threshold number of network devices (beamformers) in the WLAN have reported a detected change within a particular WLAN coverage area.

In some embodiments, the network device can select the second device from a plurality of devices to initiate a sounding process for the purpose of detecting physical activities in the environment based on a location of the second device. In some embodiments, the network device can select a subset of devices for initiating sounding process. In such cases, the network device determines that the one or more physical entities within the environment have moved based on feedback information for wireless signals received by each respective device of the subset of devices. Note that, selection of the subset of devices can be based on, for example, locations of the devices (e.g., selecting geographically separated and diverse client devices), or a load at each of the APs in WLAN, etc.

In some embodiments, the system performs one or more actions in response to determining that the one or more physical entities within the physical environment have moved. For example, the system may turn on or off lights, camera, and/or security alert in the physical environment. As another example, the system can alert a particular web service or group of subscribers, etc. In general, the system may initiate any alert or emergency actions that are predefined by the network administrator. The actions are not limited to WLAN actions. They can be any actions performed by WLAN entities or non-WLAN entities.

System for Detecting Movement in a Physical Environment

Figure 6:
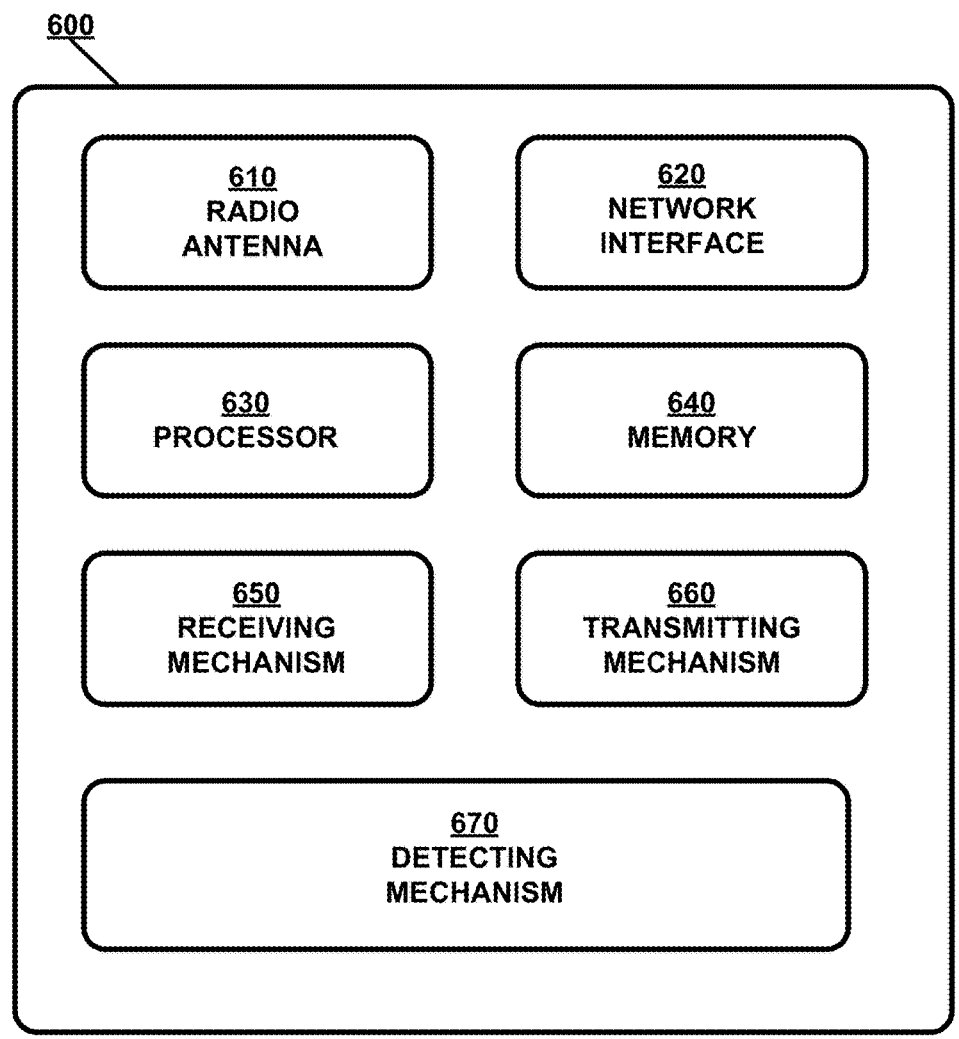
FIG. 6 is a block diagram illustrating an exemplary system for detecting movement in a physical environment according to embodiments of the present disclosure.

FIG. 6 is a block diagram illustrating a system for detecting movement in a physical environment according to embodiments of the present disclosure.

Network device 600 includes at least one or more radio antennas 610 capable of either transmitting or receiving radio signals or both, a network interface 620 capable of communicating to a wired or wireless network, a processor 630 capable of processing computing instructions, and a memory 640 capable of storing instructions and data. Moreover, network device 600 further includes an receiving mechanism 650, a transmitting mechanism 660, and a detecting mechanism 670, all of which are in communication with processor 630 and/or memory 640 in network device 600. Network device 600 may be used as a client system, or a server system, or may serve both as a client and a server in a distributed or a cloud computing environment.

Radio antenna 610 may be any combination of known or conventional electrical components for receipt of signaling, including but not limited to, transistors, capacitors, resistors, multiplexers, wiring, registers, diodes or any other electrical components known or later become known.

Network interface 620 can be any communication interface, which includes but is not limited to, a modem, token ring interface, Ethernet interface, wireless IEEE 802.11 interface, cellular wireless interface, satellite transmission interface, or any other interface for coupling network devices.

Processor 630 can include one or more microprocessors and/or network processors. Memory 640 can include storage components, such as, Dynamic Random Access Memory (DRAM), Static Random Access Memory (SRAM), etc.

Receiving mechanism 650 generally receives one or more network messages via network interface 620 or radio antenna 610 from a wireless client. The received network messages may include, but are not limited to, compressed beamforming action frames, requests and/or responses, beacon frames, management frames, control path frames, and so on. Further, receiving mechanism 650 may receive feedback information from a client device indicating characteristics of a channel in a multipath environment.

In particular, in some embodiments, receiving mechanism 650 obtains a first feedback information for a first set of wireless signals transmitted by a first device in a physical environment and received by a second device in the physical environment. In some embodiments, receiving mechanism 650 obtains a second feedback information for a second set of wireless signals transmitted by the first device and received by the second device. The first feedback information and the second feedback information are to be compared by detecting mechanism 670.

Moreover, in some embodiments, receiving mechanism 650 obtains a third feedback information for a third set of wireless signals transmitted by a third device and received by a fourth device in an environment. In some embodiments, receiving mechanism obtains a fourth feedback information for a fourth set of wireless signals transmitted by the first device and received by the second device. The third feedback information and the fourth feedback information are to be compared by detecting mechanism 670.

In some embodiments, the first feedback information includes a first Power Delay Profile (PDP) and the second feedback information includes a second PDP. In some embodiments, the first feedback information includes a first Channel State Information (CSI) generated by the second device, whereas the second feedback information includes a second CSI generated by the second device. In some embodiments, the first feedback information or the second feedback information is not affected by signal interference in the environment.

Transmitting mechanism 660 generally transmits messages, which include, but are not limited to, requests and/or responses, beacon frames, management frames, control path frames, and so on. In some embodiments, transmitting mechanism 660 transmits a sounding frame, e.g., an NDP Announcement frame, an NDP frame, a beamforming report poll frame, etc.

Detecting mechanism 670 generally detects physical activities in the WLAN. Specifically, detecting mechanism 670 compares the first feedback information to the second feedback information to identify a first set of one or more difference values. Based on the first set of one or more difference values, detecting mechanism 670 determines that one or more physical entities within the physical environment have moved.

In some embodiments, detecting mechanism 670 compares the third feedback information to the fourth feedback information to identify a second set of one or more difference values. Moreover, detecting mechanism 670 determines that one or more physical entities within the environment have moved based on the first set of difference values and the second set of difference values.

Note that, detecting mechanism 670 can determine that one or more physical entities within the environment have moved based on determining a distance that the one or more physical entities have moved within the physical environment. Alternatively, detecting mechanism 670 can determine that one or more physical entities within the environment have moved based on determining a frequency with which the one or more physical entities have moved within the environment. As another example, detecting mechanism 670 can determine that one or more physical entities within the environment have moved can be based determining a number of physical entities that moved within the environment.

In addition, detecting mechanism 670 determines that the one or more physical entities within the environment has moved further based on comparing (a) a third feedback information for a third set of wireless signals transmitted by the first device and received by the second device with (b) the first feedback information.

In some embodiments, determining that the one or more physical entities within the physical environment have moved is performed without the use of a location of the first device or the location of the second device.

Note that, the one or more physical entities within the physical environment that are determined to have moved may be neither the first device nor the second device. For example, the one or more physical entities within the physical environment can be one or more of humans or animals or any other objects.

In some embodiments, the first device is a Wireless Access Point (WAP), whereas the second device is a client device in a WLAN. In some embodiments, the first set of wireless signals include a first set of sounding frames, whereas the second set of wireless signals include a second set of sounding frames.

In some embodiments, detecting mechanism 670 selects the second device, from a plurality of devices, based on a location of the second device. In some embodiments, detecting mechanism 670 selects a subset of devices from a plurality of devices, and determines that the one or more physical entities within the environment have moved based on feedback information for wireless signals received by each respective device of the subset of devices.

Furthermore, detecting mechanism 670 may perform one or more actions in response to determining that the one or more physical entities within the physical environment have moved.

The present disclosure may be realized in hardware, software, or a combination of hardware and software. The present disclosure may be realized in a centralized fashion in one computer system or in a distributed fashion where different elements are spread across several interconnected computer systems coupled to a network. A typical combination of hardware and software may be an access point with a computer program that, when being loaded and executed, controls the device such that it carries out the methods described herein.

The present disclosure also may be embedded in non-transitory fashion in a computer-readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; or any connector for receiving a portable memory device such as a Universal Serial Bus "USB" flash drive), which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

As used herein, "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like.

As used herein, "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

As used herein, the term "interconnect" or used descriptively as "interconnected" is generally defined as a communication pathway established over an information-carrying medium. The "interconnect" may be a wired interconnect, wherein the medium is a physical medium (e.g., electrical wire, optical fiber, cable, bus traces, etc.), a wireless interconnect (e.g., air in combination with wireless signaling technology) or a combination of these technologies.

As used herein, "information" is generally defined as data, address, control, management (e.g., statistics) or any combination thereof. For transmission, information may be transmitted as a message, namely a collection of bits in a predetermined format. One type of message, namely a wireless message, includes a header and payload data having a predetermined number of bits of information. The wireless message may be placed in a format as one or more packets, frames or cells.

As used herein, "wireless local area network" (WLAN) generally refers to a communications network links two or more devices using some wireless distribution method (for example, spread-spectrum or orthogonal frequency-division multiplexing radio), and usually providing a connection through an access point to the Internet; and thus, providing users with the mobility to move around within a local coverage area and still stay connected to the network.

As used herein, the term "mechanism" generally refers to a component of a system or device to serve one or more functions, including but not limited to, software components, electronic components, electrical components, mechanical components, electro-mechanical components, etc.

As used herein, the term "embodiment" generally refers an embodiment that serves to illustrate by way of example but not limitation.

It will be appreciated to those skilled in the art that the preceding examples and embodiments are exemplary and not limiting to the scope of the present disclosure. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations and equivalents as fall within the true spirit and scope of the present disclosure.

While the present disclosure has been described in terms of various embodiments, the present disclosure should not be limited to only those embodiments described, but can be practiced with modification and alteration within the spirit and scope of the appended claims. Likewise, where a reference to a standard is made in the present disclosure, the reference is generally made to the current version of the standard as applicable to the disclosed technology area. However, the described embodiments may be practiced under subsequent development of the standard within the spirit and scope of the description and appended claims. The description is thus to be regarded as illustrative rather than limiting.

What is claimed is:

1. A non-transitory computer readable medium comprising instructions which, when executed by a processor, causes the processor to:
    obtain first feedback information for a first set of wireless signals transmitted by a first device of a plurality of devices in a physical environment and received by a second device of the plurality of devices in the physical environment;
    obtain second feedback information for a second set of wireless signals transmitted by the first device and received by the second device;
    generate a beamforming report poll to determine that the first feedback information and the second feedback information have been obtained;
    compress the first and the second feedback information;
    generate a steering matrix wherein the steering matrix describes how to direct signals from the first device to the second device;
    compare the first feedback information to the second feedback information to identify a first set of difference values;
    determine a change in the steering matrix;
    determine that physical activities have occurred in the physical environment based on the change in the steering matrix having been detected by a threshold number of devices of the plurality of devices;
    based on the first set of difference values and the change in the steering matrix detected by the threshold number of devices, determine that a number of physical entities within the physical environment have moved; and
    perform an action in response to the determination that the number of physical entities has moved, wherein the action alerts a web service to the movement of the physical entities.

2. The medium of claim 1, wherein the first device and the second device are at same respective locations during transmission of the first set of wireless signals and the second set of wireless signals, and wherein a same transmission power and radiation pattern are used for transmitting the first set of wireless signals and the second set of wireless signals.

3. The medium of claim 1, wherein the number of physical entities are different than both the first device and the second device.

4. The medium of claim 1, wherein the instructions to determine that the number of physical entities within the environment have moved based on the first set of difference values include instructions to determine a plurality of physical entities that moved within the environment.

5. The medium of claim 1, wherein the first feedback information comprises a first Power Delay Profile (PDP) and the second feedback information comprises a second PDP.

6. The medium of claim 1, wherein the first feedback information comprises a first Channel State Information (CSI) generated by the second device and wherein the second feedback information comprises a second CSI generated by the second device.

7. The medium of claim 1, wherein the instructions to determine that the number of physical entities within the environment has moved further includes instructions to compare:
    a third feedback information for a third set of wireless signals transmitted by the first device and received by the second device; and
    the first feedback information.

8. The medium of claim 1, wherein the instructions to that the number of physical entities within the physical environment have moved include instructions to determine that the number of physical entities have moved without the use of a location of the first device or the location of the second device.

9. The medium of claim 1, wherein the number of physical entities within the physical environment that are determined to have moved are not either of the first device or the second device.

10. The medium of claim 1, wherein the number of physical entities within the physical environment are of humans or animals.

11. The medium of claim 1 wherein the first device is a Wireless Access Point (WAP) and the second device is a client device.

12. The medium of claim 1, wherein the first set of wireless signals comprise a first set of sounding frames and wherein the second set of wireless signals comprise a second set of sounding frames.

13. The medium of claim 1, further comprising instructions to:
    obtain a third feedback information for a third set of wireless signals transmitted by a third device and received by a fourth device in an environment
    obtain a fourth feedback information for a fourth set of wireless signals transmitted by the first device and received the second device;
    compare the third feedback information to the fourth feedback information to identify a second set of difference values; and
    determine that the number of physical entities within the environment have moved is based on the first set of difference values and the second set of difference values.

14. The medium of claim 1, further comprising instructions to select the second device, from a plurality of devices, based on a location of the second device.

15. The medium of claim 1, further comprising instructions to:
    select a subset of devices from a plurality of devices; and
    determine that the number of physical entities within the environment have moved based on feedback information for wireless signals received by each respective device of the subset of devices.

16. The medium of claim 1, further comprising instructions to perform actions in response to the determination that the number of physical entities within the physical environment have moved.

17. The medium of claim 1, wherein the first feedback information is not affected by signal interference in the environment.

18. The medium of claim 1, wherein the instructions to determine that the number of physical entities within the environment have moved based on the first set of difference values include instructions to determine a distance that the number of physical entities have moved within the physical environment.

19. The medium of claim 1, wherein the instructions to determine that the number of physical entities within the environment have moved based on the first set of difference values include instructions to determine a frequency with which the number of physical entities have moved within the environment.

20. A system comprising:
a device including a hardware processor;
the processor to perform operations comprising:
obtaining a first feedback information for a first set of wireless signals transmitted by a first device of a plurality of devices in a physical environment and received by a second device of the plurality of devices in the physical environment;
obtaining second feedback information for a second set of wireless signals transmitted by the first device and received by the second device;
generate a beamforming report poll to determine that the first feedback information and the second feedback information have been obtained;
compress the first and the second feedback information;
generating a steering matrix based on the first and second feedback information, wherein the steering matrix describes how to direct signals from the first device to the second device;
determine a change in the steering matrix;
determine that physical activities have occurred in the physical environment based on the change in the steering matrix having been detected by a threshold number of devices of the plurality of devices;
comparing the first feedback information to the second feedback information to identify a set of difference values;
based on the set of difference values and the change in the steering matrix detected by the threshold number of devices, determining that a number of physical entities within the physical environment have moved;
and performing a particular activity in response to the confirmation that the number of physical entities within the physical environment have moved, wherein the action alerts a web service to the movement of the physical entities.

* * * * *